United States Patent
Ebina et al.

(10) Patent No.: US 8,355,301 B2
(45) Date of Patent: Jan. 15, 2013

(54) DISC TRANSPORTATION MECHANISM AND DISK PROCESSING DEVICE

(75) Inventors: Koichi Ebina, Matsumoto (JP); Atsushi Nishioka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 833 days.

(21) Appl. No.: 12/426,155

(22) Filed: Apr. 17, 2009

(65) Prior Publication Data

US 2009/0262609 A1    Oct. 22, 2009

(30) Foreign Application Priority Data

Apr. 18, 2008   (JP) .................................. 2008-108625

(51) Int. Cl.
  *G11B 21/08*   (2006.01)
  *G11B 17/03*   (2006.01)
(52) U.S. Cl. .................. 369/30.57; 369/30.45; 720/704; 720/614
(58) Field of Classification Search ................ 369/30.55, 369/30.36, 30.45, 30.39, 30.48, 30.43, 30.57; 720/619, 704, 623, 626, 601, 614, 606; 294/213, 294/902, 93; 414/796.6
See application file for complete search history.

(56) References Cited

U.S. PATENT DOCUMENTS

| | | | |
|---|---|---|---|
| 6,400,659 B1 | 6/2002 | Kitaoka | |
| 6,760,052 B2 | 7/2004 | Cummins et al. | |
| 6,802,070 B2 | 10/2004 | Britz et al. | |
| 7,061,515 B2 | 6/2006 | Cummins et al. | |
| 7,191,455 B2 | 3/2007 | Murata et al. | |
| 7,209,156 B2 | 4/2007 | Cummins et al. | |
| 7,301,550 B2 | 11/2007 | Cummins et al. | |
| 7,878,565 B2 * | 2/2011 | Arai | ................................ 294/93 |
| 8,104,812 B2 * | 1/2012 | Arai | ............................. 294/213 |
| 2007/0267881 A1 | 11/2007 | Arai | |
| 2008/0273433 A1 | 11/2008 | Nishioka et al. | |

FOREIGN PATENT DOCUMENTS

| | | |
|---|---|---|
| CN | 1653536 A | 8/2005 |
| CN | 1717729 A | 1/2006 |
| CN | 101156198 A | 4/2008 |
| JP | 2000-260172 A | 9/2000 |
| JP | 2007-310923 A | 11/2000 |

* cited by examiner

*Primary Examiner* — Ali Neyzari
(74) *Attorney, Agent, or Firm* — Kilpatrick Townsend & Stockton LLP (57) ABSTRACT

A disc transportation mechanism for a disc processing device holds and transports discs by gripping the center hole of the disc. The disc transportation mechanism has a hole position detector and a position adjustment mechanism. The hole position detector detects the position of the center hole in a disc discharged to a disc transfer position from a label printer. The position adjustment mechanism can change the position of the gripping mechanism on the arm. After moving the arm to the disc transfer position, the transportation mechanism control unit controls the arm moving mechanism and/or position adjustment mechanism based on the detected position of the center hole to move the gripping mechanism to a picking position where it can grip the disc. The gripping mechanism can therefore correctly grip the disc even when the disc is not correctly discharged to the disc transfer position, and label damage can therefore be prevented.

14 Claims, 8 Drawing Sheets

DISC TRANSPORTATION MECHANISM AND DISK PROCESSING DEVICE

CROSS-REFERENCES TO RELATED APPLICATIONS

This application claims priority to Japanese Patent Application No. 2008-108625, filed Apr. 18, 2008, the entire disclosure of which is incorporated by reference herein.

BACKGROUND OF THE INVENTION

1. Field of Invention

The present invention generally relates to a disc transportation mechanism, and more particularly to a disc processing device that holds and conveys discs using the center hole of a disc.

2. Description of Related Art

Disc processing systems such as CD/DVD publishers commonly have an inkjet printer for printing labels, and a disc transportation mechanism for conveying the discs. The inkjet printer typically has a printer tray for conveying the discs. When a disc is supplied to the inkjet printer, the printer tray is moved so that the label side of the disc passes the printing position of the inkjet head to print a label. When printing is completed, the printer tray is moved again and the disc is discharged to a disc transfer position.

The disc transportation mechanism has a gripping mechanism that grips the center part of the disc, an arm that on which the gripping mechanism is disposed, and an arm moving mechanism that moves the arm. When a disc is discharged from the inkjet printer to the disc transfer position, the disc transportation mechanism moves the arm to the disc transfer position. When at the disc transfer position, the gripping mechanism is set to the gripping position where it can grip the center part of the disc. When the gripping mechanism has gripped the disc, the disc transportation mechanism causes the arm to move and conveys the processed disc to the disc discharge stacker.

Japanese Unexamined Patent Appl. Pub. JP-A-2000-260172 teaches a disc processing device that has such an inkjet printer and disc transportation mechanism. The gripping mechanism described in JP-A-2000-260172 inserts three fingers into the center hole that is formed in the center of each disc and drives one of the fingers radially out to push against the inside circumference edge of the center hole and grip the disc.

When the printer tray, and the mechanism that moves the printer tray, wear and age, it may not be possible to correctly discharge the disc to the disc transfer position. When this happens it may not be possible to accurately align the position of the gripping mechanism to the center of the disc even if the disc transportation mechanism positions the gripping mechanism to the gripping position after moving the arm to the disc transfer position. As a result, the gripping mechanism may contact the label surface and the label surface may be marred or otherwise damaged. Another problem is that the gripping mechanism may not be able to properly grip the center of the disc and the disc may be dropped.

Because the disc is discharged from the inkjet printer immediately after being printed, the ink on the label side of the disc discharged to the media transfer position is not dry. As a result, the printed label may be damaged if the gripping mechanism touches the label surface, and the disc may therefore be wasted. The label side may also be damaged or dust or other foreign matter may adhere if the disc is dropped, and the disc may thus be wasted.

BRIEF SUMMARY OF THE INVENTION

A disc transportation mechanism for a disc processing device according to embodiments of the present invention, can hold the center part of a disc without soiling the label even when the disc is not discharged to the correct position from an inkjet printer. Another aspect of the invention is a disc processing device having this disc transportation mechanism.

Yet, another aspect of the invention provides a disc transportation mechanism for a disc processing device that can correctly pick up a disc that is not correctly positioned. Yet, another aspect of the invention is a disc processing device having this disc transportation mechanism.

A disc transportation mechanism for holding and carrying a disc discharged from an inkjet printer to a disc transfer position in a disc processing device, including: a gripping mechanism for picking and holding the center part of a disc; an arm on which the gripping mechanism is mounted; an arm moving mechanism that moves the arm; a position adjustment mechanism that changes the mounting position of the gripping mechanism relative to the arm; a hole position detector that detects the position of the center hole in the disc at the disc transfer position; and a controller that causes the gripping mechanism to move to a picking position where the disc in the disc transfer position can be picked up by controlling driving at least one of the arm moving mechanism and the position adjustment mechanism based on the position of the center hole detected by the hole position detector.

The disc transportation mechanism according to this aspect of the invention, has a hole position detector that detects the position of the center hole in the disc discharged to the disc transfer position from an inkjet printer. The position of the center hole in the disc, and more particularly the position of the center part of the disc, can therefore be accurately determined even when the disc is not accurately discharged to the disc transfer position because of parts wear or aging.

In addition, because the disc transportation mechanism also has a position adjustment mechanism that can change the position of the gripping mechanism mounted on the arm, the gripping mechanism can be moved to a position where it can pick up the disc even when a disc is not accurately discharged from the inkjet printer to the disc transfer position by controlling driving the arm moving mechanism and/or position adjustment mechanism. The gripping mechanism will therefore not contact the label side of a disc printed by the inkjet printer and the label side will therefore not be damaged when the gripping mechanism grips the center part of a disc. Discs are also prevented from being dropped as a result of not being properly gripped. The label will therefore not be damaged and the disc will not be wasted when a freshly printed disc is discharged from the label printer and picked up before the ink has dried.

In order to change the mounting position of the gripping mechanism in a disc transportation mechanism according to another aspect of the invention, the arm has a frame that is disposed pivotably to the arm, the gripping mechanism is mounted at a position separated from the pivot axis of the frame, and the position adjustment mechanism causes the frame to pivot.

In order to change the mounting position of the gripping mechanism in a disc transportation mechanism according to another aspect of the invention, the arm moving mechanism causes the arm to pivot around a guide shaft and to move vertically in the axial direction of the guide shaft, the arm has a frame attached to the arm so that the frame can move along a tangent to a circle of which the center is the guide shaft, the gripping mechanism is mounted on the frame, and the position adjustment mechanism causes the frame to move.

In order to change the mounting position of the gripping mechanism in a disc transportation mechanism according to another aspect of the invention, the arm moving mechanism causes the arm to pivot around a guide shaft and to move vertically in the axial direction of the guide shaft, the arm has a frame attached to the arm so that the frame can move radially to the guide shaft, the gripping mechanism is mounted on the frame, and the position adjustment mechanism causes the frame to move.

In order to change the mounting position of the gripping mechanism in a disc transportation mechanism according to another aspect of the invention, the arm moving mechanism causes the arm to move horizontally in a direction substantially perpendicular to the guide shaft, and to move vertically in the axial direction of the guide shaft, the arm has a frame attached to the arm so that the frame can move along a tangent to a circle of which the center is the guide shaft, the gripping mechanism is mounted on the frame, and the position adjustment mechanism causes the frame to move.

In order to change the mounting position of the gripping mechanism in a disc transportation mechanism according to another aspect of the invention, the arm moving mechanism causes the arm to move horizontally in a direction substantially perpendicular to the guide shaft, and to move vertically in the axial direction of the guide shaft, the arm has a frame attached to the arm so that the frame can move radially to the guide shaft, the gripping mechanism is mounted on the frame, and the position adjustment mechanism causes the frame to move.

In order to detect the position of the center hole of the disc discharged to the disc transfer position in another aspect of the invention, the hole position detector includes a camera, and an analyzing unit that analyzes images captured by the camera and detects the position of the center hole.

The camera can be fixed to a position where photographing the disc transfer position is possible, but in order to detect the position of the center hole while analyzing the image captured by the camera in real time, the photographic lens of the camera is preferably mounted on the arm.

When the photographic lens of the camera is mounted on the arm, the gripping mechanism preferably inserts a plurality of fingers disposed in a circle to the center hole, and grips the disc by spreading at least one of the fingers radially to the outside to push against the inside circumference of the center hole, and the photographic lens of the camera is disposed to the center of the plural fingers.

This aspect of the invention is suitable for moving the gripping mechanism to the picking position based on the position of the center hole detected in real time by analyzing the captured image because the imaging position of the camera is aligned with the center of the gripping mechanism.

In order to detect the position of the center hole by means of a sensor, the hole position detector in a disc transportation mechanism according to another aspect of the invention has a photosensor mounted on the frame, and an analyzing unit that detects the position of the center hole based on an output signal from the photosensor. The photosensor detects light reflected by the disc, and the controller controls the arm moving mechanism and/or position adjustment mechanism to make the photosensor move above the disc discharged to the disc transfer position, and causes the gripping mechanism to move to the picking position based on the position of the center hole detected while the photosensor moved.

In order to detect the position of the center hole by means of a sensor, a disc transportation mechanism according to another aspect of the invention also has an illumination means for emitting light to the disc from below the disc transfer position. The hole position detector includes a photosensor mounted on the frame, and an analyzing unit that detects the position of the center hole based on an output signal from the photosensor. The photosensor detects light passing through the center hole of the disc, and the controller controls the arm moving mechanism and/or position adjustment mechanism to make the photosensor move above the disc discharged to the disc transfer position, and causes the gripping mechanism to move to the picking position based on the position of the center hole detected while the photosensor moved.

In a disc transportation mechanism according to another aspect of the invention, the hole position detector detects the position of the center hole of a disc discharged from a disc drive to a second disc transfer position, and the controller moves the gripping mechanism to a second picking position where a disc discharged to the second disc transfer position can be gripped by controlling driving the arm moving mechanism and/or position adjustment mechanism based on the position of the center hole detected by the hole position detector.

The disc transportation mechanism according to this aspect of the invention can thus accurately determine the position of the center hole in the disc, and more particularly the position of the center part of the disc, even when the disc is not accurately discharged from the disc drive to the second disc transfer position because of parts wear or aging.

The gripping mechanism can also be moved to a second picking position where it can pick up the disc by the controller controlling driving the arm moving mechanism and/or position adjustment mechanism based on the detected position of the center hole. The gripping mechanism will therefore not contact the label side of the disc and will not damage the label side of the disc when the disc is picked from the disc drive. Discs are also prevented from being dropped as a result of not being properly gripped.

Yet, another aspect of the invention provides a disc processing device having a disc drive, an inkjet printer, and the disc transportation mechanism described above.

A disc transportation mechanism according to another aspect of the invention, is a disc transportation mechanism for picking up a disc at a disc transfer position and then carrying the disc, the disc transportation mechanism including a gripping mechanism for holding a disc; an arm on which the gripping mechanism is mounted; an arm moving mechanism that moves the arm; a position adjustment mechanism that changes the position of the gripping mechanism relative to the arm; a hole position detector that detects the position of the center hole in the disc at the disc transfer position; and a controller that causes the gripping mechanism to move to a picking position where the disc in the disc transfer position can be picked up by controlling driving at least one of the arm moving mechanism and the position adjustment mechanism based on the position of the center hole detected by the hole position detector.

The disc transportation mechanism according to this aspect of the invention, has a hole position detector that detects the position of the center hole in the disc at the disc transfer position. The position of the center hole in the disc, and more particularly the position of the center part of the disc, can therefore be accurately determined even when the disc is not accurately positioned to the disc transfer position.

In addition, because the disc transportation mechanism also has a position adjustment mechanism that can change the position of the gripping mechanism, the gripping mechanism can be moved to a position where it can pick up the disc even when a disc is not positioned accurately to the disc transfer position by controlling driving the arm moving mechanism and/or position adjustment mechanism. The gripping mechanism will therefore not contact and damage the disc when gripping the center part of a disc. Discs are also prevented from being dropped as a result of not being properly gripped.

Yet, another aspect of the invention provides a disc processing device that has, in addition to this disc transportation mechanism of the invention, at least one of a disc drive having a tray for carrying discs and a printer having a tray for carrying discs.

When a tray is used to carry the discs, aging and wear of parts can result in discs not being correctly discharged to the disc transfer position. Even when a disc is not discharged to the proper disc transfer position, however, the invention can move the gripping mechanism to a picking position where it can pick up a disc by controlling driving the arm moving mechanism and/or position adjustment mechanism. The gripping mechanism will therefore not contact and damage the disc when gripping the center part of a disc. Discs are also prevented from being dropped as a result of not being properly gripped.

A disc transportation mechanism according to another aspect of the invention, is a disc transportation mechanism for a disc processing device that picks up a disc at a disc transfer position and then transports the disc, the disc transportation mechanism having a gripping mechanism for holding a disc, an arm on which the gripping mechanism is mounted, an arm moving mechanism that moves the arm, a hole position detector that detects the position of the center hole in the disc at the disc transfer position, and a controller that causes the gripping mechanism to move to a picking position where the disc in the disc transfer position can be picked up by controlling driving at least the arm moving mechanism based on the position of the center hole detected by the hole position detector.

The disc transportation mechanism according to this aspect of the invention has a hole position detector that detects the position of the center hole in the disc at the disc transfer position. The position of the center hole in the disc, and more particularly the position of the center part of the disc, can therefore be accurately determined even when the disc is not accurately positioned to the disc transfer position.

In addition, because the disc transportation mechanism can change the position of the gripping mechanism by controlling driving the arm moving mechanism, the gripping mechanism can be moved to a position where it can pick up the disc even when the disc is not positioned accurately to the disc transfer position. The gripping mechanism will therefore not contact and damage the disc when gripping the center part of a disc. Discs are also prevented from being dropped as a result of not being properly gripped.

Yet, another aspect of the invention provides a disc processing device that has, in addition to this disc transportation mechanism of the invention, at least one of a disc drive having a tray for carrying discs and a printer having a tray for carrying discs.

The invention has a hole position detector that detects the position of the center hole of a disc discharged to a disc transfer position. As a result, the position of the center hole in the disc, and more particularly the position of the center part of the disc, can be accurately determined even when the disc is not accurately positioned to the disc transfer position.

The disc transportation mechanism also has a position adjustment mechanism that can change the position of the gripping mechanism on the arm. As a result, when a disc is not correctly positioned to the disc transfer position, the gripping mechanism can be moved to a picking position where it can grip the disc by controlling driving at least the arm moving mechanism. As a result, the gripping mechanism will not contact the disc and will not damage the disc when gripping the center part of the disc. Discs are also prevented from being dropped as a result of not being correctly gripped.

When the invention is used as a transportation mechanism for discs that are printed by an inkjet printer, the invention has a hole position detector that detects the position of the center hole of a disc discharged from the inkjet printer to a disc transfer position. As a result, the position of the center hole in the disc, and more particularly the position of the center part of the disc, can be accurately determined even when discs are not correctly discharged to the disc transfer position due to parts aging or wear.

Furthermore, because the disc transportation mechanism of the invention has a position adjustment mechanism that can change the position of the gripping mechanism on the arm, the gripping mechanism can be moved to a picking position where it can grip the disc even when the disc is not accurately discharged from the label printer to the disc transfer position by controlling driving the arm moving mechanism and/or position adjustment mechanism. As a result, the gripping mechanism will not contact the label side of the disc and will not damage the label when gripping the center part of the disc. Damaging the label and wasting discs can therefore be prevented when picking freshly printed discs that are discharged from the inkjet printer before the ink has dried.

Other objects and attainments together with a fuller understanding of the invention will become apparent and appreciated by referring to the following description and claims taken in conjunction with the accompanying drawings.

DESCRIPTION OF PREFERRED EMBODIMENTS

A disc processing device according to a first embodiment of the present invention is described below with reference to the accompanying figures.

Figure 1:
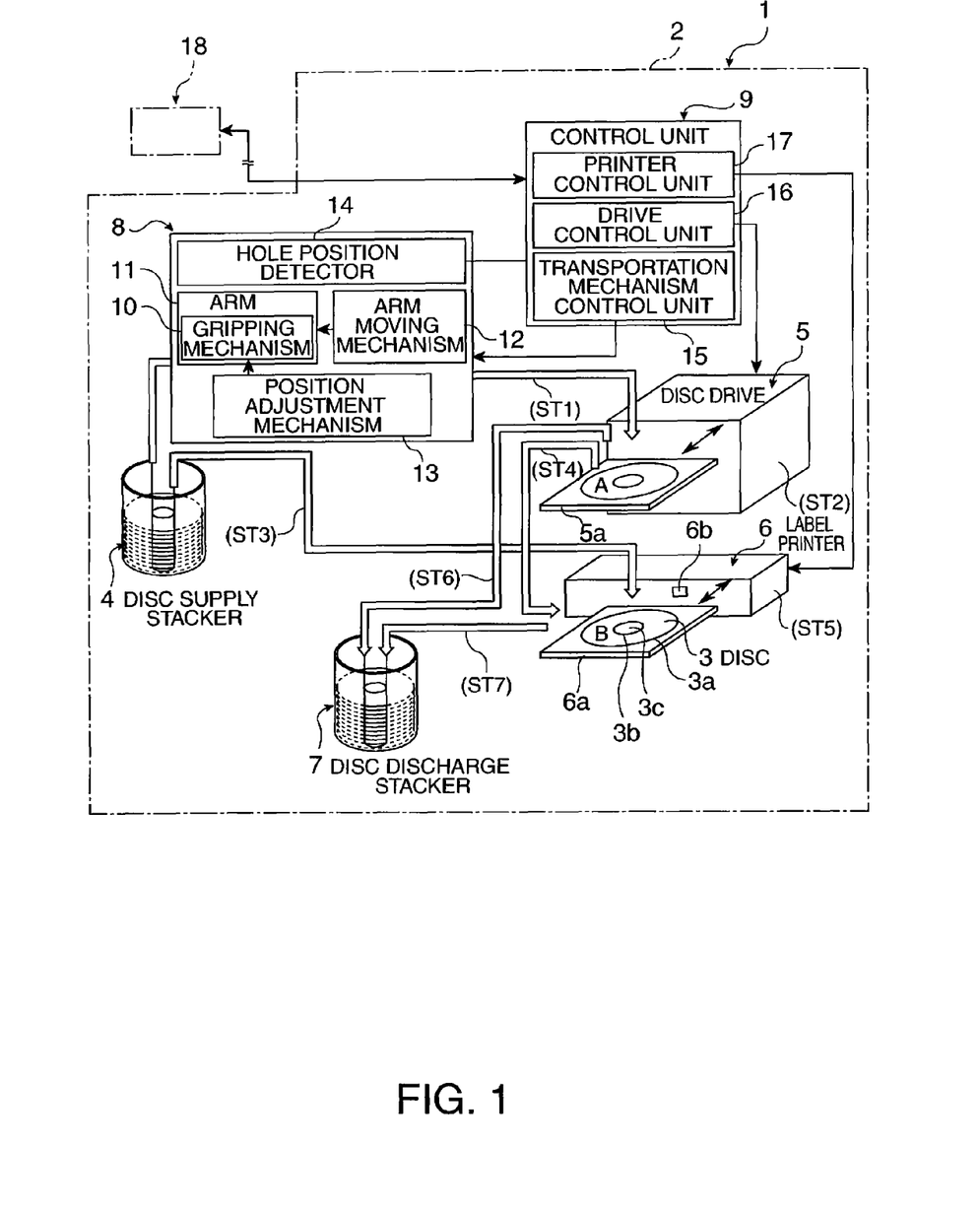
FIG. 1 is a schematic overview of a CD/DVD publisher, according to one embodiment of the invention.

General Configuration:

FIG. 1 is a schematic overview of a CD/DVD publisher, according to one embodiment of the present invention.

Inside the outside case 2, the CD/DVD publisher 1 has a disc supply stacker 4 that stores blank discs or other writable discs 3, a disc drive 5 for writing data to discs 3 and reading data from discs 3, a label printer 6 for printing a label on the label surface 3a of a disc 3, a disc discharge stacker 7 that stores the discs 3 after data writing or label printing, for example, a disc transportation mechanism 8 that conveys the discs 3 between different stations, and a control unit 9 including a CPU, ROM, and RAM for controlling driving the other parts of the CD/DVD publisher 1.

The disc supply stacker 4 and disc discharge stacker 7 store the discs 3 stacked one on top of another with the label surfaces 3a facing up.

When the disc tray 5a, of the disc drive 5, is discharged to the media loading position and a disc 3 is supplied to the disc tray 5a, the disc tray 5a is pulled back into the disc drive 5 to write data to or read data from the disc 3 on the disc tray 5a. When data writing or reading is completed, the disc tray 5a is pulled out to discharge the disc 3 to a disc transfer position A (second disc transfer position). The disc 3 is then passed to the disc transportation mechanism 8 at the disc transfer position A.

The label printer 6 is an inkjet printer and has a printer tray 6a for conveying the discs 3. When the printer tray 6a is moved to a specific discharge position and a disc 3 is supplied to the printer tray 6a, the label printer 6 causes the printer tray 6a to move so that the label surface 3a of the disc 3 passes the printing position of the inkjet head 6b and prints a label. When printing is completed, the label printer 6 moves the printer tray 6a to a specific discharge position and discharges the disc 3 to a disc transfer position B. The disc 3 is transferred to the disc transportation mechanism 8 at the disc transfer position B.

The disc transportation mechanism 8 includes a gripping mechanism 10 for gripping and holding the center part 3b of the disc 3, an arm 11 that carries the gripping mechanism 10, and a arm moving mechanism 12 for moving the arm 11. The disc transportation mechanism 8 also has a position adjustment mechanism 13 for adjusting the position of the gripping mechanism 10 to the arm 11, a hole position detector 14, and a transportation mechanism control unit 15.

The hole position detector 14 detects the position of the center hole 3c in the disc 3 discharged to disc transfer position A or B. The transportation mechanism control unit 15 controls the arm moving mechanism 12 and/or position adjustment mechanism 13 based on the position of the center hole 3c detected by the hole position detector 14, and moves the gripping mechanism 10 to a picking position where it can grip the center part 3b of the disc 3. Note that the transportation mechanism control unit 15 is rendered as a part of the control unit 9.

The control unit 9 includes the transportation mechanism control unit 15, a drive control unit 16 that controls the disc drive 5, and a printer control unit 17 that controls the label printer 6, and controls the CD/DVD publisher 1 by the cooperative interaction of these control units.

Disc publishing commands are inputted to the control unit 9 from a host device 18 such as a personal computer or a server connected via a LAN or other communication network. A disc publishing command may include a data write request and a label printing request.

When a data write request is included in the disc publishing command, the transportation mechanism control unit 15 controls the disc transportation mechanism 8 to pick and supply a disc 3 from the disc supply stacker 4 to the disc drive 5 (step ST1). The drive control unit 16 then causes the disc drive 5 to write the data (step ST2).

If a label printing request is included in the disc publishing command, the transportation mechanism control unit 15 controls the disc transportation mechanism 8 to pick and supply a disc 3 from the disc supply stacker 4 to the label printer 6 (step ST3). Alternatively, the transportation mechanism control unit 15 controls the disc transportation mechanism 8 to pick up the disc 3 from the disc transfer position A, to which it is discharged when data writing is completed, and supply the disc 3 to the label printer 6 (step ST4). The printer control unit 17 then causes the label printer 6 to print a label (step ST5).

When processing the disc 3 is completed, the transportation mechanism control unit 15 controls the disc transportation mechanism 8 to pick up and carry the disc 3 discharged to the disc transfer position A, of the disc drive 5, to the disc discharge stacker 7 (step ST6). Alternatively, the transportation mechanism control unit 15 controls the disc transportation mechanism 8 to pick up and carry the disc 3, discharged to the disc transfer position B of the label printer 6, to the disc discharge stacker 7 (step ST7).

When the disc transportation mechanism 8 picks up a disc 3, that is discharged to the disc transfer position A of the disc drive 5 in step ST4 and step ST6, the transportation mechanism control unit 15 controls the arm moving mechanism 12 and/or position adjustment mechanism 13 based on the position of the center hole 3c detected by the hole position detector 14, and moves the gripping mechanism 10 to the picking position (second picking position) where it can grip the center part 3b of the disc 3.

When the disc transportation mechanism 8 picks up a disc 3 that is discharged to the disc transfer position B of the label printer 6 in step ST7, the transportation mechanism control unit 15 also controls the arm moving mechanism 12 and/or position adjustment mechanism 13 based on the position of the center hole 3c detected by the hole position detector 14, and moves the gripping mechanism 10 to the picking position where it can grip the center part 3b of the disc 3.

A typical disc publishing operation whereby the CD/DVD publisher 1 produces a disc, when a disc publishing command containing a data write request and a label printing request is received, is described next.

When the data write request is received from the host device 18, a disc 3 is picked from the disc supply stacker 4 and supplied to the disc drive 5 (step ST1), and the write data supplied with the data write request is recorded (step ST2). When writing is completed the disc 3 is supplied to the label printer 6 (step ST4), and the label information supplied with the data write request is printed to the label surface 3a (step ST5). When printing is completed the disc 3 is discharged to the disc discharge stacker 7 (step ST7).

Figure 2:
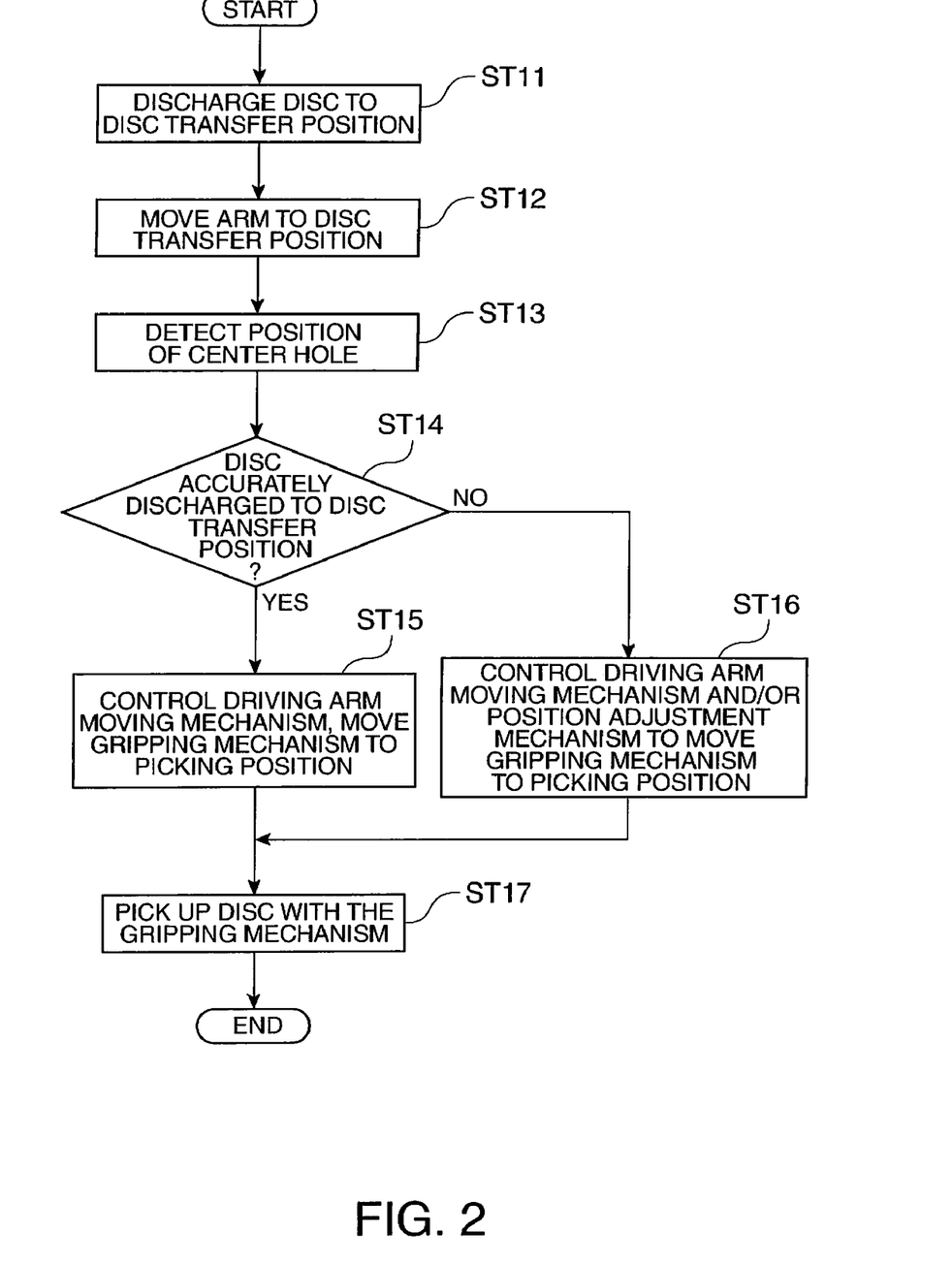
FIG. 2 is a flow chart describing the disc gripping operation of a disc transportation mechanism, according to one embodiment of the invention.

Disc Picking Operation:

FIG. 2 is a flow chart describing the disc 3 picking operation of the disc transportation mechanism 8. The operation of the gripping mechanism 10 picking a disc 3, that has been discharged from the label printer 6 to the disc transfer position B, is described next with reference to FIG. 2. Note that the disc transportation mechanism 8 picks the disc 3 discharged to the disc transfer position A from the disc drive 5 using the same operation.

When the label printer 6 finishes printing a label, the disc 3 is discharged on the printer tray 6a to the disc transfer position B (step ST11). When the disc 3 is discharged, the transportation mechanism control unit 15 controls the arm moving mechanism 12 to move the arm 11 to the disc transfer position B (step ST12).

When the arm 11 is positioned to the disc transfer position B, the hole position detector 14 detects the position of the center hole 3c in the disc 3 discharged to the disc transfer position B (step ST13). Based on the detected position of the center hole 3c, the hole position detector 14 determines if the disc 3 was discharged correctly to the disc transfer position B (step ST14).

If the disc 3 was discharged correctly to the disc transfer position B in step ST14, the transportation mechanism control unit 15 controls the arm moving mechanism 12 to move the gripping mechanism 10 to the picking position where it can grip the center part 3b of the disc 3 (step ST15).

If the disc 3 is discharged correctly to the disc transfer position B, there is no wear or aging in the printer tray 6a or the mechanism for moving the printer tray 6a, and the location of the disc transfer position is still the same position that was set at the factory prior to shipping. In this case the transportation mechanism control unit 15 can move the gripping mechanism 10 to the picking position by simply controlling driving the arm moving mechanism 12 to move the arm 11 to a specific predetermined position.

If the disc 3 was not discharged correctly to the disc transfer position B in step ST14, the transportation mechanism control unit 15 controls the position adjustment mechanism 13 to adjust the position where the gripping mechanism 10 is carried and move the gripping mechanism 10 to the picking position. The transportation mechanism control unit 15 also controls the arm moving mechanism 12 and position adjustment mechanism 13 to change the position of the arm 11 and gripping mechanism 10 and move the gripping mechanism 10 to the picking position. Alternatively, the arm moving mechanism 12 is controlled to move the position of the arm 11 to a different position than the specific predetermined position, and move the gripping mechanism 10 to the picking position (step ST16).

If the disc 3 is not discharged correctly to the disc transfer position B, the printer tray 6a or the mechanism for moving the printer tray 6a is affected by wear or aging, and the location of the disc transfer position deviates from the position that was set at the factory prior to shipping. In this case the gripping mechanism 10 cannot be moved to the picking position by simply controlling driving the arm moving mechanism 12 to move the arm 11 to the specific predetermined position. The transportation mechanism control unit 15 must therefore control driving the arm moving mechanism 12 and/or position adjustment mechanism 13 based on the position of the center hole 3c detected by the hole position detector 14 to move the gripping mechanism 10 to the picking position.

Once the gripping mechanism 10 is set to the picking position in step ST15 or step ST16, the gripping mechanism 10 grips the center part 3b of the disc 3 and carries the disc 3 (step ST17).

Beneficial Effects:

The disc transportation mechanism 8 in this aspect of the invention has a hole position detector 14 for detecting the position of the center hole 3c of the disc 3 that is discharged from the label printer 6 to the disc transfer position A or B. As a result, the disc transportation mechanism 8 can accurately determine the position of the center hole 3c of the disc 3, or more particularly the center part 3b of the disc 3, even if the disc 3 is not correctly discharged to the disc transfer position A or B due to aging or wear, for example.

Furthermore, because the disc transportation mechanism 8 has a position adjustment mechanism 13 for changing the position where the gripping mechanism 10 is carried on the arm 11, the gripping mechanism 10 can be moved to a picking position where it can grip the disc 3 by controlling driving the arm moving mechanism 12 and/or position adjustment mechanism 13 when the disc 3 is not discharged accurately to the disc transfer position A or B. The gripping mechanism 10 will thus not contact the label surface 3a of the disc 3 and will not damage the label surface 3a when gripping the center part 3b of the disc 3. The disc 3 will also not be dropped as a result of not being properly gripped. The label will therefore not be damaged and a disc 3 will not be wasted when a freshly printed disc 3 is discharged from the label printer 6 and conveyed before the ink has dried.

Alternative Embodiments of the Disc Picking Operation:

In the example described above the hole position detector 14 detects the position of the center hole 3c after the arm 11 is positioned to the disc transfer position B in step ST12.

In the disc 3 picking operation described below, the position of the center hole 3c is detected after the disc 3 is discharged to the disc transfer position B in step ST11.

In this alternative embodiment of the invention, the transportation mechanism control unit 15 controls the arm moving mechanism 12 and/or position adjustment mechanism 13 to move the gripping mechanism 10 to the picking position based on the center hole 3c position detected by the hole position detector 14. More specifically, the gripping mechanism 10 can be moved directly to the picking position without the arm moving mechanism 12 positioning the arm 11 to the disc transfer position B.

Further alternatively, the hole position detector 14 may detect the position of the center hole 3c in real time while the arm moving mechanism 12 moves the arm 11 to the disc transfer position B in step ST12. In this situation the transportation mechanism control unit 15 controls the arm moving mechanism 12 and/or position adjustment mechanism 13 to move the gripping mechanism 10 to the picking position based on the position of the center hole 3c detected in real time. More specifically, the gripping mechanism 10 can be moved directly to the picking position without the arm moving mechanism 12 positioning the arm 11 to the disc transfer position B.

Figure 3:
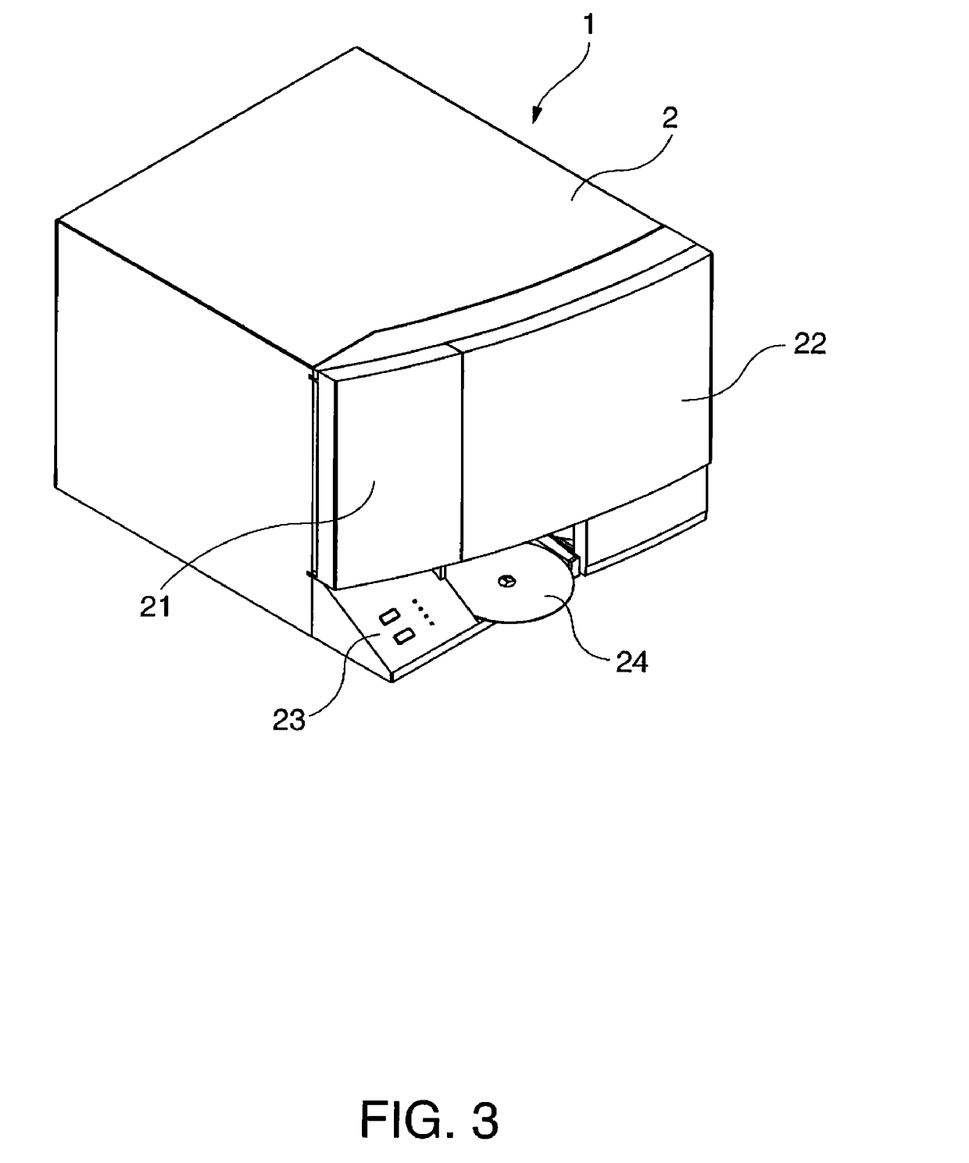
FIG. 3 is an oblique view of a CD/DVD publisher, according to one embodiment of the invention.
Figure 4:
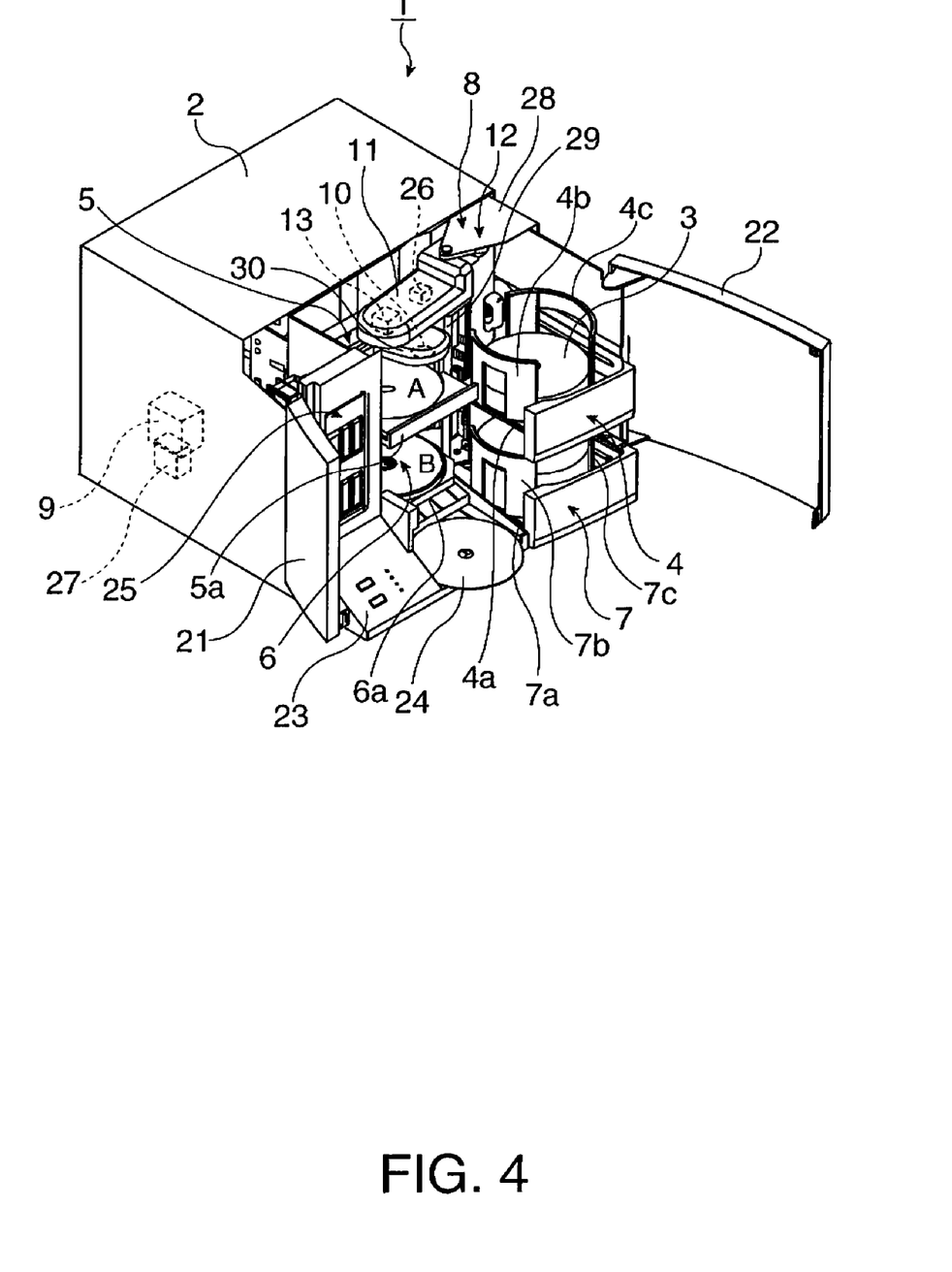
FIG. 4 is an oblique view of the CD/DVD publisher of FIG. 3 with the access doors open so that the inside can be seen.

Configuration of the CD/DVD Publisher:

FIG. 3 is an oblique view of a CD/DVD publisher 1, according to one embodiment of the invention. FIG. 4 is an oblique view of the CD/DVD publisher 1 with part of the top of the case 2 removed and the right and left access doors open so that the inside of the CD/DVD publisher 1 can be seen.

As shown in FIG. 3, the CD/DVD publisher 1 has a rectangular box-like case 2, and right and left access doors 21 and 22 that can open and close the front of the case 2. An operating panel 23 having display indicators and operating buttons, for example, is disposed below the left-side access door 21. A disc exit 24 is rendered beside the operating panel 23.

When the left and right access doors 21 and 22 open as shown in FIG. 4, the disc supply stacker 4 for storing blank media or other writable discs 3, and the disc discharge stacker 7 into which the discs 3 are discharged after data writing and label printing are completed, are disposed coaxially one above the other on the right side inside the case 2 of the CD/DVD publisher 1. The disc transportation mechanism 8 is located behind the disc supply stacker 4 and disc discharge stacker 7.

The disc drive 5 is disposed on top and the label printer 6 is disposed on the bottom at a position beside the disc supply stacker 4, disc discharge stacker 7, and disc transportation mechanism 8. In FIG. 4 the disc tray 5a of the disc drive 5 is shown set to the disc transfer position. The position of the disc tray 5a, when thus moved forward, is the disc transfer position A to which the discs 3 are discharged after data writing is completed.

The printer tray 6a of the label printer 6 is also shown discharged from the front of the label printer 6. The position on the printer tray 6a, when thus positioned, is the disc transfer position B to which the discs 3 are discharged after label printing is completed. The disc transfer position A of the disc drive 5 and the disc transfer position B of the label printer 6 are set so that they are vertically coincident.

An ink cartridge loading unit 25 that carries the ink cartridges for supplying ink to the label printer 6 is disposed beside the disc drive 5 and label printer 6.

The control unit 9 including the CPU, ROM, and RAM is located behind the ink cartridge loading unit 25.

The hole position detector 14 for detecting the position of the center hole 3c of the disc 3 discharged to disc transfer position A or B includes a camera 26 and an analyzer 27. The analyzer 27 analyzes the image captured by the camera 26 and detects the position of the center hole 3c in real time. The analyzer 27 is located behind the ink cartridge loading unit 25 with the control unit 9.

The disc supply stacker 4 includes a sliding panel 4a that can be pulled forward and horizontally, and a pair of left and right curved side walls 4b and 4c disposed rising vertically from the sliding panel 4a. When writable discs 3 are stored or added to the disc supply stacker 4, the right side access door 22 is opened and the sliding panel 4a is pulled forward. The discs 3 are then inserted from above, between the curved side walls 4b and 4c, so that the discs 3 are stored in a coaxial stack in the disc supply stacker 4, and the disc supply stacker 4 is then returned inside the case 2.

Similarly to the disc supply stacker 4, the disc discharge stacker 7 also has a sliding panel 7a that can be pulled forward and horizontally, and a pair of left and right curved side walls 7b and 7c disposed rising vertically from the sliding panel 7a. After writing data to the disc 3 is completed, or printing a label on the disc 3 is completed, the disc 3 is deposited by the disc transportation mechanism 8, from above between the curved side walls 7b and 7c, so that the discs 3 are stored in a coaxial stack in the disc discharge stacker 7. The discs 3 accumulated in the disc discharge stacker 7 can then be removed in a batch by opening the right side access door 22 and pulling the sliding panel 7a forward.

The disc transportation mechanism 8 includes a chassis 28 disposed vertically in the case 2, a vertical guide shaft 29, and the arm 11, which is attached to the vertical guide shaft 29. The vertical guide shaft 29 extends vertically between horizontal support plates disposed at the top and bottom of the chassis 28.

The arm 11 can be moved up and down along the vertical guide shaft 29 and can be pivoted right and left on this vertical guide shaft 29 by the arm moving mechanism 12. A frame 30 is pivotably attached to the distal end part of the arm 11, and the gripping mechanism 10 is mounted on this frame 30. The position adjustment mechanism 13 changes the position of the gripping mechanism 10 to the arm 11 by causing the frame 30 to pivot, and the camera 26 of the hole position detector 14, are also mounted on the arm 11.

A gap enabling the arm 11 to move vertically is also formed between pairs of left and right side walls 4b and 4c and side walls 7b and 7c in the disc supply stacker 4 and disc discharge stacker 7.

A space enabling the arm 11 to pivot horizontally, for positioning directly above the selected stacker, is also formed between the top and bottom disc supply stacker 4 and disc discharge stacker 7.

When the arm 11 pivots horizontally from above the disc supply stacker 4, the disc 3, discharged onto the disc tray 5a of the disc drive 5 to the disc transfer position A, can be accessed. When the top disc tray 5a is pulled into the disc drive 5 and the arm 11 is then lowered, the disc 3 discharged on the printer tray 6a of the label printer 6 to the disc transfer position B can also be accessed.

If the arm 11 is lowered, after the top and bottom disc tray 5a and printer tray 6a are retracted into the disc drive 5 and label printer 6, respectively, the disc exit 24 can be accessed.

Discs 3 can therefore be carried to different stations by appropriately combining the operations that move the arm 11 vertically and cause the arm 11 to pivot right and left.

Figure 5:
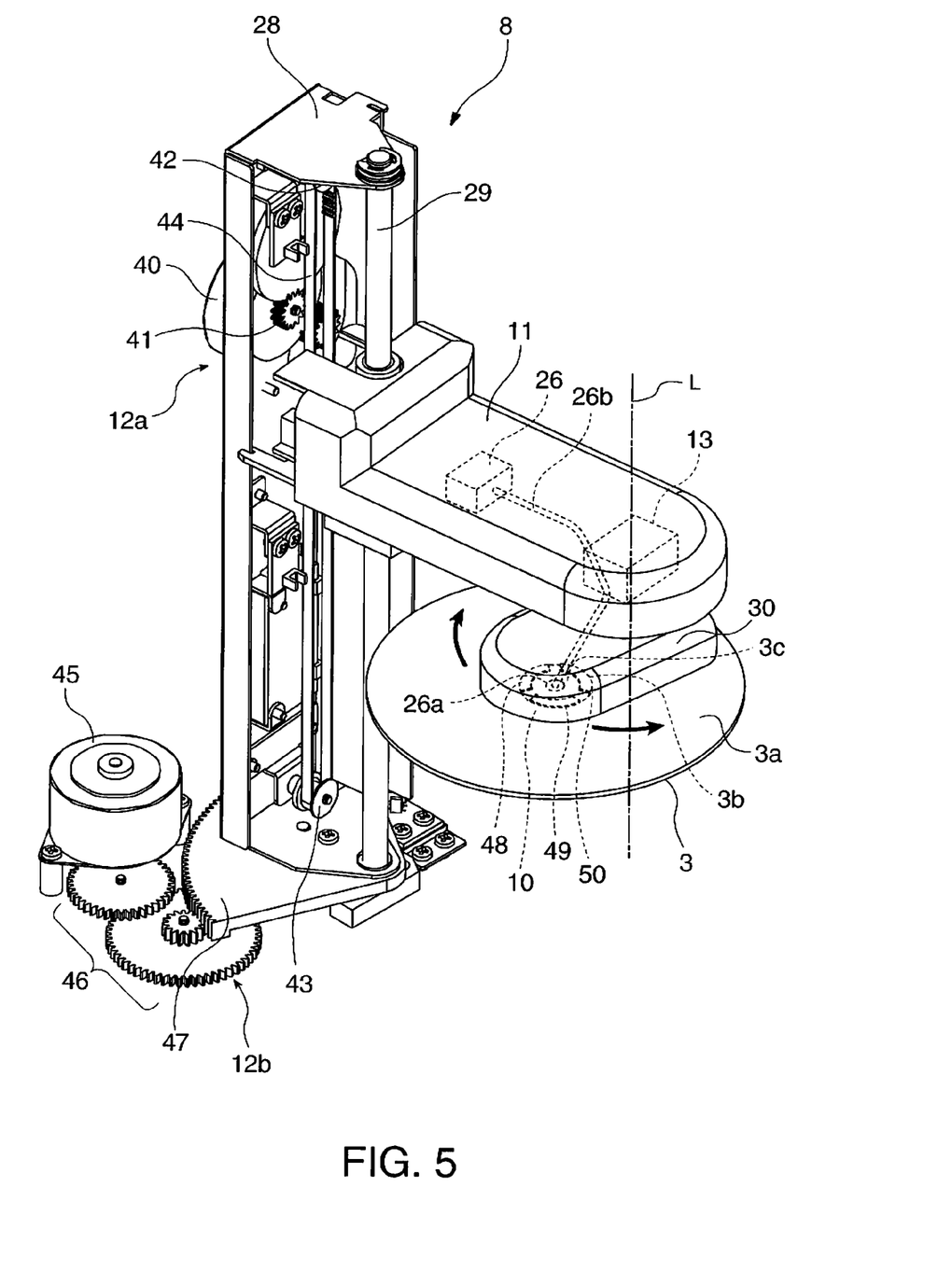
FIG. 5 is an oblique view of a disc transportation mechanism, according to one embodiment of the invention.

Disc Transportation Mechanism:

FIG. 5 is an oblique view showing the main parts of the disc transportation mechanism 8.

The disc transportation mechanism 8 includes a motor 40 disposed to the chassis 28 as the drive power source of the elevator mechanism 12a of the arm moving mechanism 12. Rotation of the motor 40 is transferred through a gear train 41 to a drive pulley 42 disposed near the top of the chassis 28. A driven pulley 43 is disposed near the bottom of the chassis 28. A timing belt 44 is mounted on the drive pulley 42 and driven pulley 43. A base end part of the arm 11 is affixed to the timing belt 44 on either the right or left side. The timing belt 44 therefore moves vertically when the motor 40 is driven, and the arm 11 attached thereto moves up or down along the vertical guide shaft 29.

The pivoting mechanism 12b of the arm moving mechanism 12 has a motor 45 as a drive power source, and the output shaft of this motor 45 is connected to a fan-shaped final gear 47 through a gear train 46. This fan-shaped final gear 47 can pivot right and left on the vertical guide shaft 29. The chassis 28, on which the components of the elevator mechanism 12a of the arm 11 are assembled, is mounted on the final gear 47. Because the fan-shaped final gear 47 pivots left or right when the motor 45 is driven, the chassis 28 mounted on the final gear 47 moves in unison therewith, and pivots left or right on the vertical guide shaft 29. As a result, the arm 11 supported by the elevator mechanism 12a mounted on the chassis 28 also pivots left or right around the vertical guide shaft 29.

The frame 30 is pivotably attached to the distal end part of the arm 11, and the gripping mechanism 10 is mounted at a position separated from the pivot axis L of the frame 30.

The position adjustment mechanism 13 that causes the frame 30 to pivot is also mounted on a distal end part of the arm 11. When the position adjustment mechanism 13 causes the frame 30 to pivot, the position of the gripping mechanism 10 relative to the arm 11 changes. The position adjustment mechanism 13 has a motor (not shown) as a drive power source, and drive power from the motor (not shown) causes the frame 30 to pivot.

The gripping mechanism 10 has three fingers 48, 49, and 50 disposed in a circle around a single center point. The fingers 48, 49, and 50 protrude from the bottom of the frame 30. In order to pick up a disc 3, the center of the three fingers 48, 49, and 50 is aligned vertically with the center of the center hole 3c of the disc 3. The arm 11 is then lowered to insert the three fingers 48, 49, and 50 from above the disc 3 into the center hole 3c. When the three fingers 48, 49, and 50 are thus inserted to the picking position in the center hole 3c, at least one of the three fingers 48, 49, and 50 is driven radially to the outside, and pushed against the inside circumference (center part 3b) of the center hole 3c to grip the disc 3. To release a gripped disc 3, the one or more fingers 48, 49, and 50, that was driven to the outside, is retracted to the original closed position.

The camera 26 of the hole position detector 14 is located at the base end part of the arm 11. The camera 26 has an optical fiber 26b on the distal end of which a photographic lens 26a is mounted. The photographic lens 26a is mounted on the frame 30 and positioned to the center of the three fingers 48, 49, and 50.

The camera 26 takes a picture when the arm moving mechanism 12 is positioned to disc transfer position A or B by the arm 11. The image captured by the camera 26 is analyzed in real time by the analyzer 27 to detect the position of the center hole 3c of the disc 3 discharged to the disc transfer position A or B. The detection information is inputted to the control unit 9, and based on the detected position the transportation mechanism control unit 15 controls the arm moving mechanism 12 and/or position adjustment mechanism 13 to position the gripping mechanism 10 to the picking position. More specifically, the three fingers 48, 49, and 50 are inserted to the center hole 3c.

Because the photographic position of the photographic lens 26a of the camera 26 and the center of the gripping mechanism 10 are the same, this embodiment of the invention is suited to moving the gripping mechanism 10 to the picking position based on the position of the center hole 3c, detected in real time, by analyzing the captured image.

Figure 6A:
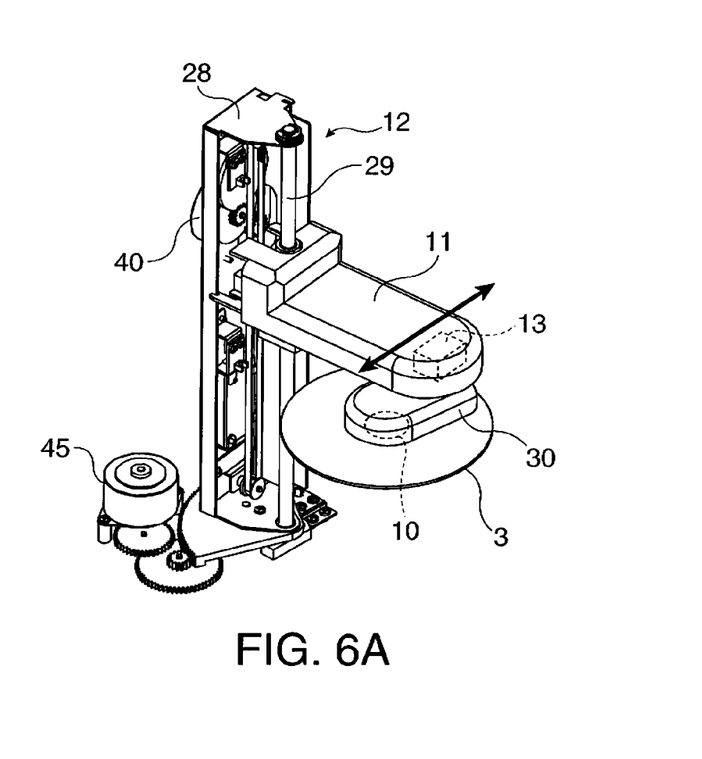
FIGS. 6A and 6B are oblique views of other disc transportation mechanisms, according to embodiments of the invention.
Figure 6B:
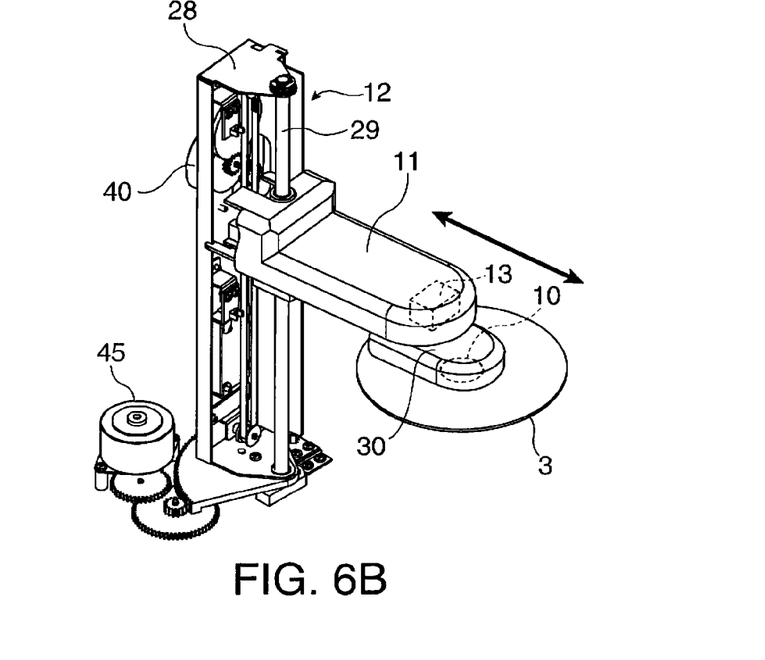

Alternative Embodiments of the Disc Transportation Mechanism:

The frame 30 in the embodiment described above is pivotably attached to the arm 11, but as shown in FIGS. 6A and 6B may be attached to the arm 11 so that the frame 30 can move on a tangent to a circle of which the vertical guide shaft 29 is the center.

Further alternatively, the frame 30 may be attached to the arm 11 so that the frame 30 can move radially with respect to the guide shaft.

The position of the gripping mechanism 10, relative to the arm 11, can be changed in either variation if the gripping mechanism 10 is mounted on the frame 30, and a mechanism for moving the frame 30 is disposed as the position adjustment mechanism 13.

The arm 11 is rendered so that the arm 11 can pivot right and left around the vertical guide shaft 29 in the embodiment described above, but also in a configuration in which the arm 11 moves horizontally in a direction substantially perpendicular to the vertical guide shaft 29. In this configuration the arm 11 is rendered in two parts with one part moving vertically along the vertical guide shaft 29, and the other part moving horizontally by means of a horizontal guide shaft connected to said one part. The horizontal movement can be achieved by the transportation mechanism control unit 15 controlling driving the arm moving mechanism 12.

The camera 26 of the hole position detector 14 and the photographic lens 26a may also be disposed to fixed positions enabling imaging the disc transfer positions A and B instead of being mounted on the arm 11. For example, if the camera 26 is affixed to the ceiling of the case 2 above the disc transfer position A of the disc drive 5, and the disc transfer position B of the label printer 6, a single camera 26 can image both disc transfer positions A and B and the position of the center hole 3c of the disc 3 can be detected because the disc transfer positions A and B are vertically coincident.

With this configuration, the camera 26 can take a picture after the disc 3 is discharged to disc transfer position A or B, the analyzer 27 can analyze the captured image and detect the position of the center hole 3c, and based on this detected position, the transportation mechanism control unit 15 can control driving the arm moving mechanism 12 and/or position adjustment mechanism 13 to move the gripping mechanism 10 to the picking position.

If a sensor is used to detect the position of the center hole 3c, the hole position detector 14 can be rendered using a photosensor disposed to the frame 30 and an analyzer 27 that detects the position of the center hole 3c based on the output signal from the photosensor.

In this configuration the photosensor may be a device that detects light reflected from the label surface 3a of the disc 3 and is disposed to the center of the plural fingers 48, 49, and 50 similarly to the photographic lens 26a. The transportation mechanism control unit 15 controls the arm moving mechanism 12 to move the arm 11 to the disc transfer position A or B, then controls the arm moving mechanism 12 and/or position adjustment mechanism 13 to move the photosensor above the disc 3 discharged to the disc transfer position A or B, and based on the position of the center hole 3c, detected while the photosensor moves, the transportation mechanism control unit 15 controls the arm moving mechanism 12 and/or position adjustment mechanism 13 to move the gripping mechanism 10 to the picking position.

Further alternatively, the photosensor may be a device that detects light passing through the center hole 3c of the disc 3, and is disposed to the center of the plural fingers 48, 49, and 50 similarly to the photographic lens 26a. An illumination source that emits light to the disc 3 is also disposed below the disc transfer position A or B. The transportation mechanism control unit 15 controls the arm moving mechanism 12 to move the arm 11 to the disc transfer position A or B, then controls the arm moving mechanism 12 and/or position adjustment mechanism 13 to move the photosensor above the disc 3 discharged to the disc transfer position A or B, and based on the position of the center hole 3c detected while the photosensor moves, the transportation mechanism control unit 15 controls the arm moving mechanism 12 and/or position adjustment mechanism 13 to move the gripping mechanism 10 to the picking position.

Alternative Embodiment of the Disc Transportation Mechanism:

A disc transportation mechanism, according to one embodiment of the invention, is described next with reference to FIG. 7. The configuration of the CD/DVD publisher according to this second embodiment of the invention is identical to the configuration described above with reference to FIG. 1 to FIG. 4, and the differences between this embodiment and the above are described below. Note that like parts in FIG. 7 and the first embodiment are identified by the same reference numerals, and further description thereof is omitted below.

Figure 7:
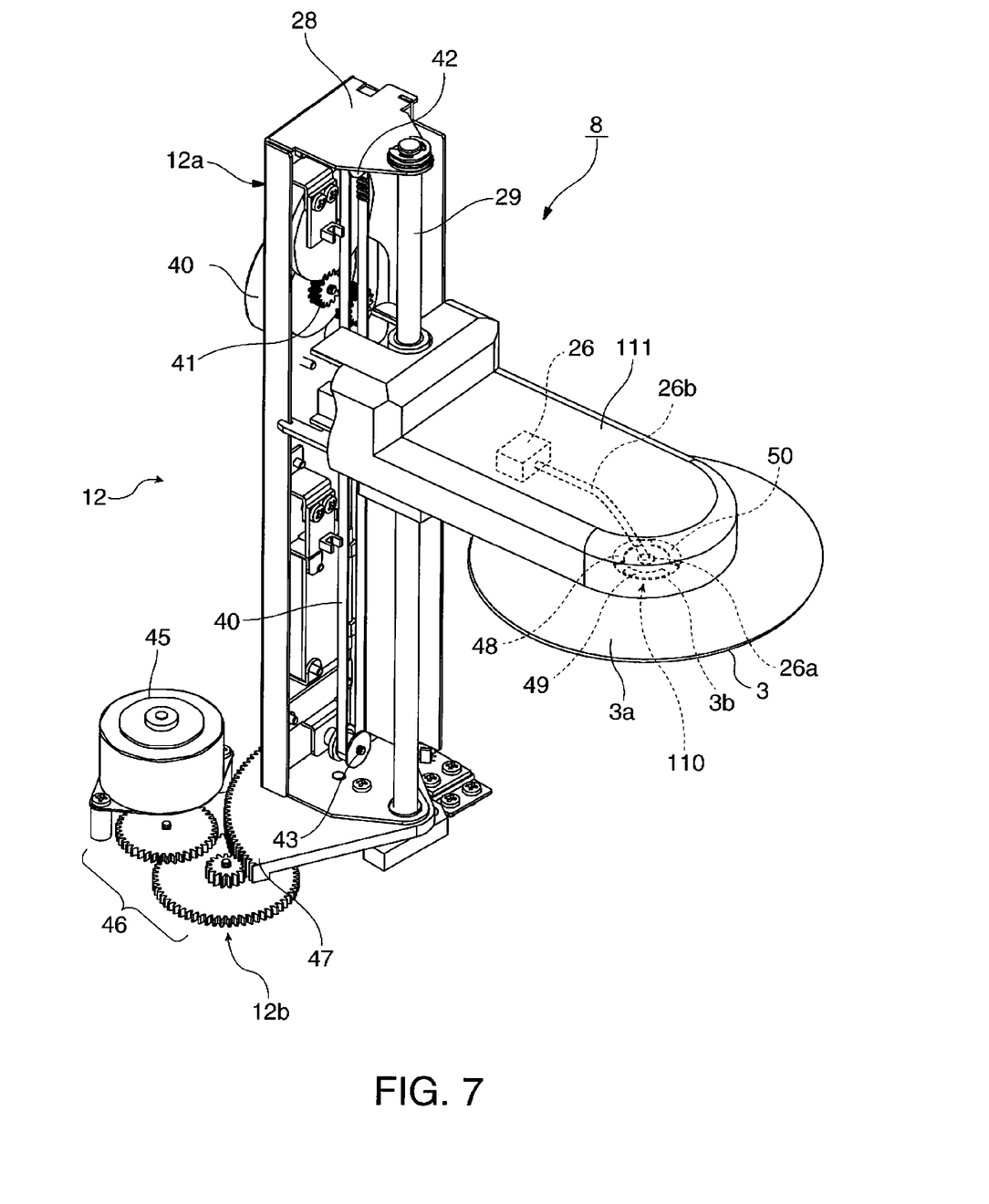
FIG. 7 is an oblique view showing another disc transportation mechanism, according to one embodiment of the invention.

As shown in FIG. 7 a gripping mechanism 110 is mounted on the arm 111, and the gripping mechanism 110 has fingers 48, 49, and 50 for holding a disc 3. The photographic lens 26a of a hole position detector 114 (position detector) is disposed inside the fingers 48, 49, and 50, and the photographic lens 26a is connected to the camera 26 by the optical fiber 26b disposed inside the arm 111.

The operation of this embodiment when picking up a disc 3 is described next. The arm 111 is first moved from a standby position to the disk picking position by the arm moving mechanism 12, which includes an elevator mechanism 12a and pivoting mechanism 12b. This causes the gripping mechanism 110 to move to a position set opposite the center hole of the disc. The hole position detector 114 then detects if the gripping mechanism is positioned correctly to the position of the center hole.

If the location of the center hole cannot be detected, it is determined that the gripping mechanism is not correctly positioned to the center hole. While the hole position detector 114 remains active, the position adjustment control unit controls the pivoting mechanism 12b to cause the arm 111 to pivot within a specific range in order to detect the position of the center hole of the disc. After the position of the center hole is detected, the elevator mechanism 12a is driven to move the arm 111 to the disc side, and the disc 3 is then picked by the gripping mechanism 110. After the disc 3 is picked, the elevator mechanism 12a moves the arm 111 in the direction away from the disc picking position (i.e., up), the pivoting mechanism 12b causes the arm 111 to pivot, and the disc is carried to the specified destination.

This aspect of the invention enables reliably gripping the center part of a disc using a configuration that is simpler than that of the above embodiment.

Figure 8:
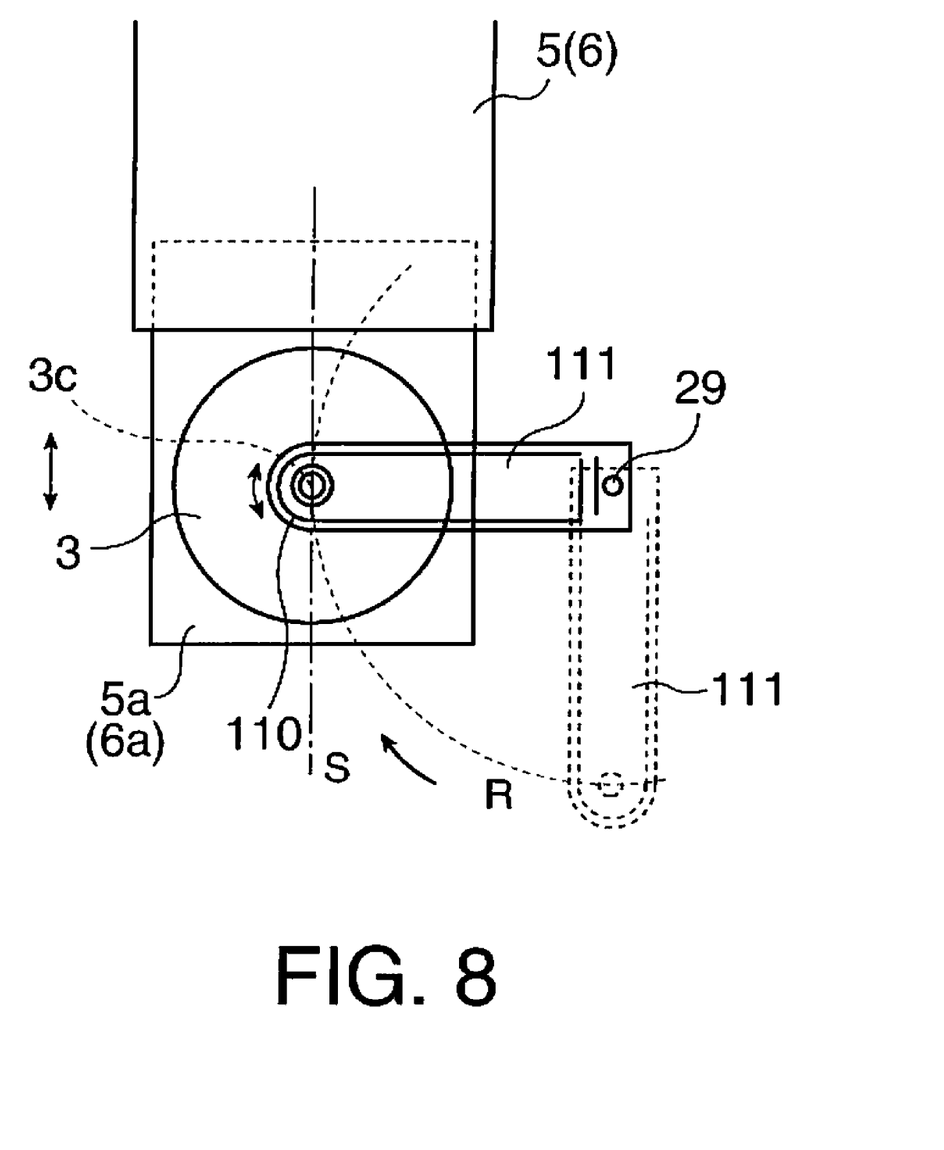
FIG. 8 shows the relationship between a tray on which the disc is carried and a disc transportation mechanism of FIG. 7.

The range of hole position detector 114 and gripping mechanism 110 movement in this embodiment of the invention is smaller than in the above embodiment described above due to the absence of the frame 30. The range in which the center hole 3c of the disc 3 can be detected is therefore also smaller. As shown in FIG. 8, the label printer 6 (or disc drive 5) and the disc transportation mechanism 8 are located so that the imaginary line S drawn by movement of the center of the center hole when the disc 3 is carried on the printer tray 6a (or disc tray 5a) is substantially tangential to the imaginary arc R drawn by the center of the gripping means when the arm 111 rotates on the vertical guide shaft 29. Because positioning in the direction of printer tray 6a (or disc tray 5a) movement can change easily due to aging, for example, this aspect of the invention can accurately detect the position of the center hole and can reliably grip the center of the disc even when the position of the tray shifts in the direction of tray movement.

If the center hole 3c cannot be detected by searching this specified range of movement, an error can be reported using a display means disposed to the CD/DVD publisher or by means of the host computer connected to the CD/DVD publisher, for example.

Alternative Embodiments

In the embodiments described above the label printer is described as being an inkjet printer, but the printer can be any type of printer, including a thermal printer, with a print head capable of printing on the label side of a disc. The media transfer position in such a printer may become imprecise as a result of wear and the effects of age on the mechanism that moves the tray, but the present invention affords a disc transportation mechanism that can reliably grip discs from the tray of such printers without damaging the disc.

The foregoing embodiments describe a disc processing device having a disc tray, a printer, and a disc transportation mechanism, but the invention can also be applied to a disc processing device having a printer and a disc transportation mechanism, or a disc processing device having a disc drive and a disc transportation mechanism, for example.

In a disc processing device having a disc drive and a disc transportation mechanism, the effects of age and wear on the mechanism for moving the disc tray that carries the disc can result in the disc transfer position becoming imprecise, but the present invention affords a disc transportation mechanism that can reliably grip discs from the tray of the disc drive without damaging the disc.

The invention is described above using a CD/DVD publisher by way of example, but the disc medium is not limited to disc media such as CDs and DVDs. More particularly, the invention can be used with any type of data storage disk, including BluRay® discs.

The disc transportation mechanism of the invention is also not limited to picking discs that are discharged from the tray of a disc drive or printer. More particularly, the disc transportation mechanism of the invention can also be used as a mechanism for accurately picking discs stored in a disc storage unit such as a disc stacker that stores a plurality of discs before the discs are processed.

The invention being thus described, may be varied in many ways. Such variations are not to be regarded as a departure from the spirit and scope of the invention, and all such modifications as would be obvious to one skilled in the art are intended to be included within the scope of the following claims.

What is claimed is:

1. A disc transportation mechanism, comprising:
a moveable arm including a moveable frame;
an arm-moving mechanism coupled to the moveable arm, and configured to move the moveable arm;
a gripping mechanism coupled to the moveable arm, wherein the gripping mechanism is mounted to the movable frame, and configured for holding a disc about a center hole of the disc;
a position adjustment mechanism configured to adjust the position of the gripping mechanism relative to the moveable arm by causing the movable frame to move;
a hole position detector for detecting the position of the center hole relative to the gripping mechanism; and
a controller configured to control the moveable arm, position adjustment mechanism, and gripping mechanism to pick up the disc based on the position of the center hole detected by the hole position detector.

2. The disc transportation mechanism as described in claim 1, wherein:
the hole position detector includes:
a photosensor mounted on the moveable frame; and
an analyzing unit that detects the position of the center hole based on an output signal from the photosensor;
wherein the photosensor detects light reflected by the disc, and
the controller is configured to move the movable frame for moving the gripping mechanism to a picking position based on the position of the detected center hole.

3. The disc transportation mechanism as described in claim 1, wherein:
the disc transportation mechanism includes an illumination source for emitting light to the disc from below the disc transfer position; and
the hole position detector includes:
a photosensor mounted on the moveable frame, and
an analyzing unit that detects the position of the center hole based on an output signal from the photosensor;
wherein the photosensor detects light passing through the center hole of the disc, and
the controller is configured to move the movable frame for moving the gripping mechanism to a picking position based on the position of the detected center hole.

4. The disc transportation mechanism as described in claim 1, wherein:
the moveable arm extending from an elongated chassis;
the chassis includes a guide shaft;
the moveable arm includes a frame, the frame being moveable along a tangent of a circle of which the center is the frame shaft;
the gripping mechanism is mounted to the frame; and
the position adjustment mechanism causes the frame to move.

5. The disc transportation mechanism as described in claim 4, wherein:
the arm moving mechanism is configured to move the moveable arm in a direction substantially perpendicular to the guide shaft, and to move vertically in an axial direction of the guide shaft.

6. The disc transportation mechanism as described in claim 1, wherein:
the moveable arm extends from an elongated chassis;
the chassis includes a guide shaft,
wherein the moveable frame is radially moveable with respect to the frame shaft;
the gripping mechanism is mounted on the frame; and
the position adjustment mechanism causes the frame to move.

7. The disc transportation mechanism as described in claim 6, wherein:
the arm moving mechanism is configured to move the moveable arm in a direction substantially perpendicular to the guide shaft, and to move vertically in the axial direction of the guide shaft.

8. The disc transportation mechanism as described in claim 1, wherein:
the hole position detector includes a camera, and an analyzing unit that analyzes images captured by the camera and detects the position of the center hole.

9. The disc transportation mechanism as described in claim 8, wherein:
a photographic lens of the camera is mounted on the moveable arm.

10. The disc transportation mechanism as described in claim 9, wherein:
the gripping mechanism includes a plurality of fingers, and is configured to grip the disc by spreading at least one of the fingers radially to the outside to push against the inside circumference of the center hole; and
the photographic lens of the camera is disposed to the center of the plural fingers.

11. The disc transportation mechanism as described in claim 1, wherein:
the hole position detector detects the position of the center hole of the disc, which is discharged from a disc drive to a second disc transfer position; and
the controller is configured to move the gripping mechanism to a second picking position about the second disc transfer position based on the position of the center hole detected by the hole position detector.

12. A disc processing device comprising:
an inkjet printer that has a printer tray that can move to a printing position and a disc transfer position while carrying the disc, and prints on a label side of the disc; and
the disc transportation mechanism as described in claim 1.

13. A disc transportation mechanism, comprising:
a moveable arm including a moveable frame, the moveable frame being moveable relative to the moveable arm;
an arm-moving mechanism coupled to the moveable arm, and configured to move the moveable arm;
a gripping mechanism mounted to the movable frame, and configured for picking and holding a disc about a center hole of the disc;
a hole position detector for detecting the position of the center hole relative to the gripping mechanism; and
a controller configured to control the moveable arm and gripping mechanism to pick up the disc based on the position of the center hole detected by the hole position detector.

14. A disc processing device comprising:
at least one of a disc drive having a tray for carrying the disc, and a printer having a tray for carrying the disc; and
the disc transportation mechanism described in claim 13.

* * * * *